United States Patent [19]

Ives

[11] Patent Number: 5,049,058
[45] Date of Patent: Sep. 17, 1991

[54] ROLLOUT APPARATUS

[75] Inventor: Frank E. Ives, Kent, Wash.

[73] Assignee: PMC, Inc., Sun Valley, Calif.

[21] Appl. No.: 452,745

[22] Filed: Dec. 18, 1989

[51] Int. Cl.$^5$ ............................................. B29C 71/00
[52] U.S. Cl. ................................... 425/328; 156/574; 156/580; 425/367; 425/374; 425/394; 425/460; 264/257
[58] Field of Search ............... 425/366, 367, 374, 394, 425/446, 460, 11, 62, 63, 218, 219, 328, 356, 363; 156/574, 580, 582; 264/257

[56] References Cited

U.S. PATENT DOCUMENTS

| | | | |
|---|---|---|---|
| 3,873,395 | 3/1975 | Ehrlich | 156/382 |
| 4,039,367 | 8/1977 | Warshaw et al. | 156/580 |
| 4,372,736 | 2/1983 | Gooch et al. | 425/367 |
| 4,461,669 | 7/1984 | Dontscheff | 156/574 |
| 4,664,741 | 5/1987 | Fechner et al. | 156/574 |
| 4,758,291 | 7/1988 | Fechner et al. | 156/71 |
| 4,787,951 | 11/1988 | Okamoto | 156/582 |

Primary Examiner—James C. Housel
Attorney, Agent, or Firm—Christensen, O'Connor, Johnson & Kindness

[57] ABSTRACT

A rollout apparatus for rolling trapped air from a resin impregnated fiber mat has two carriage assemblies mounted for reciprocated movement in opposite direction. Each of the carriage assemblies carries depending rollers that engage an impregnated fiberglass mat laid on a mold. The carriage assemblies oscillate simultaneously in opposite directions so that the turning forces generated by the reciprocation cancel each other, thus providing a smooth vibration-free mechanism.

8 Claims, 6 Drawing Sheets

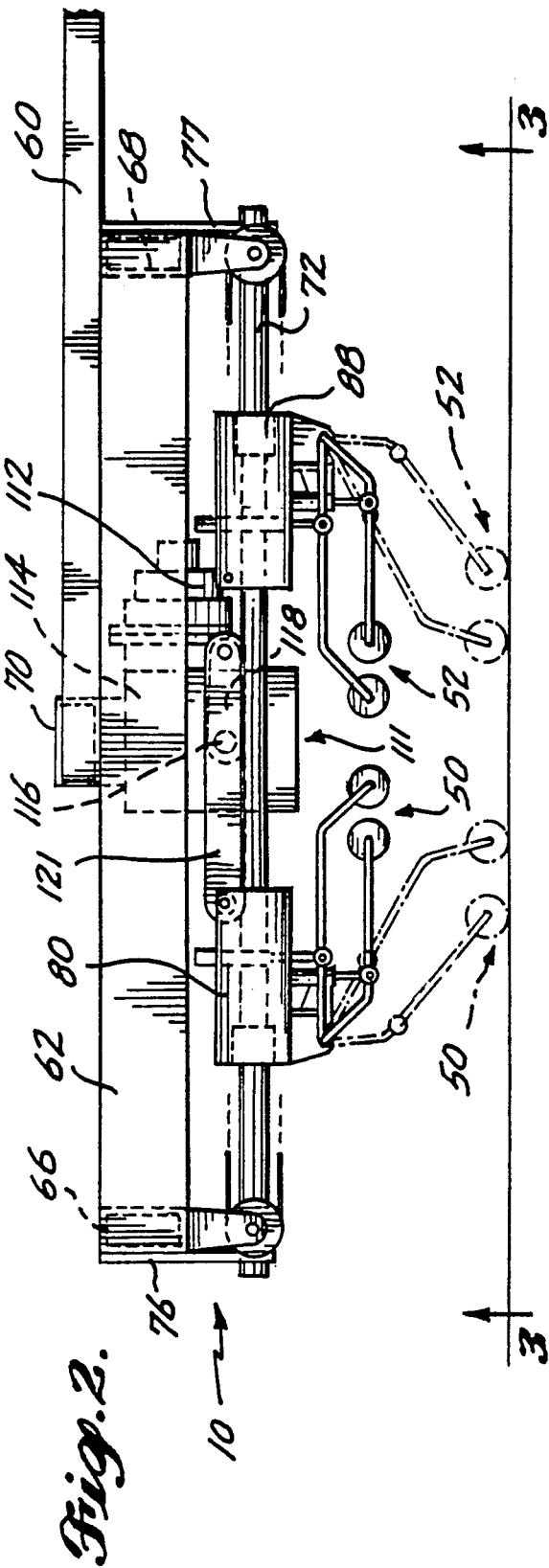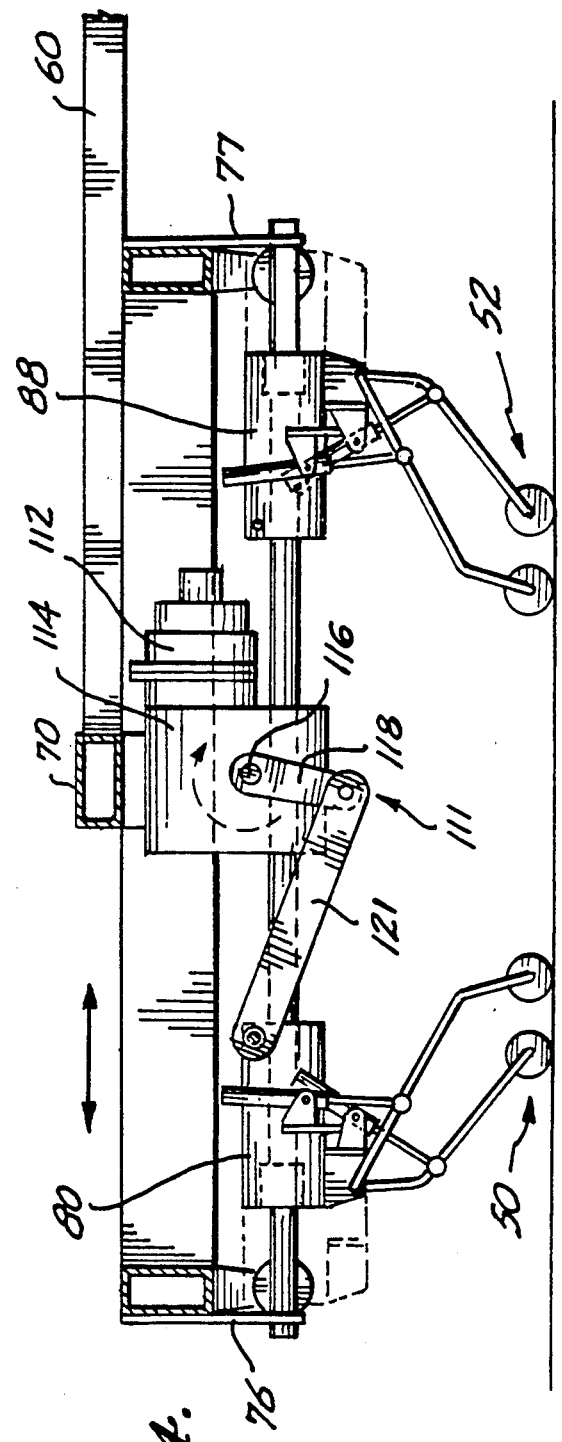

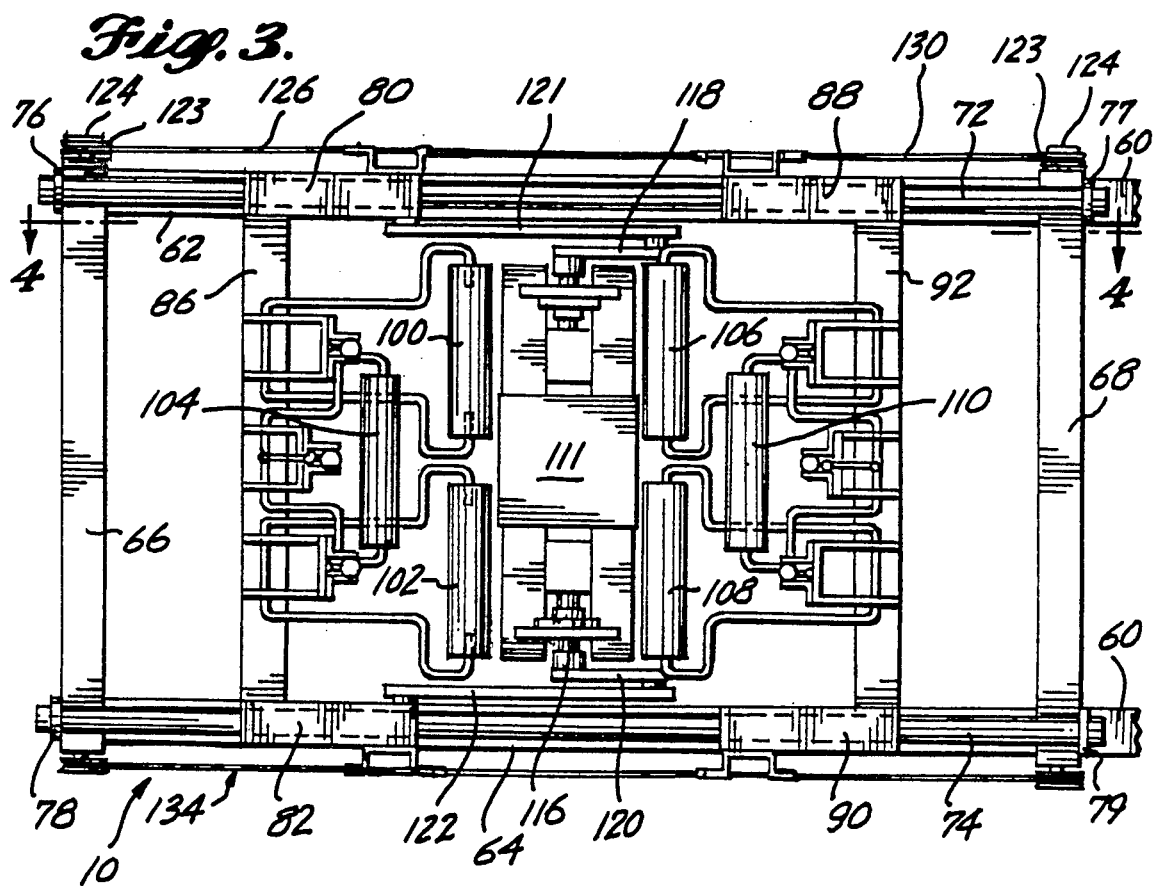
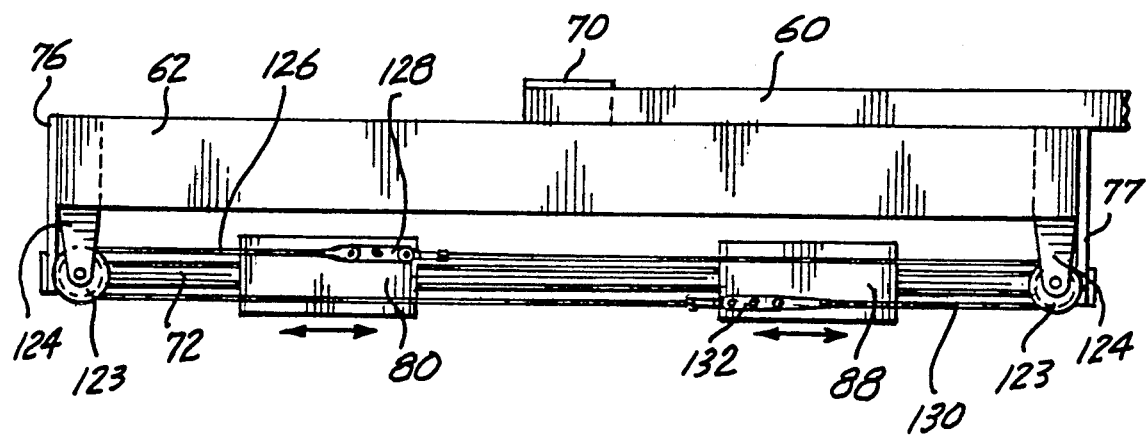

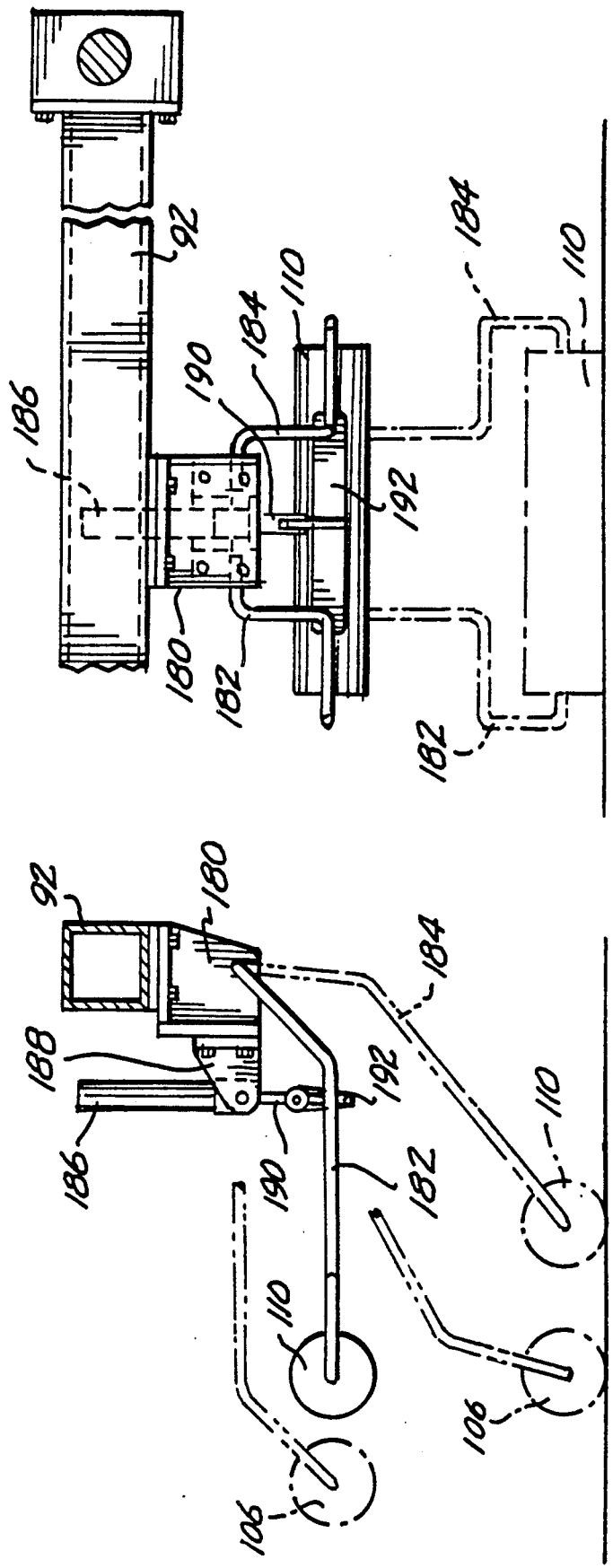

ROLLOUT APPARATUS

TECHNICAL AREA

The present invention relates to a fiberglass and resin applicating apparatus, and more particularly to a rollout apparatus for rolling trapped air from a resin-impregnated fiber mat.

BACKGROUND OF THE INVENTION

Fiberglass webs or mats are impregnated with fiberglass resin and thereafter laid on a mold. During the impregnation and laying process, air many times becomes entrapped in the fiber matrix. If the air is left entrapped in the fiber matrix, a bubble or discontinuity is formed in the final product that detracts from the physical appearance of the structure and could adversely affect the structural integrity of the cured structure. Accordingly, finned rollers have been employed to roll the impregnated fabric against the mold so as to drive entrapped air from the resin prior to curing. Manual rollout can be accomplished easily when the molds are small and can be reached by an individual. However, lay-up apparatus have now grown to proportions where manual rollout becomes difficult. Attempts have been made to mount rollers on impregnating and lay-down apparatus to follow and roll the fiberglass mat after it is laid down. It has been found, however, that a single pass of the roller is not always adequate, requiring a retracing of the lay-down path or other cumbersome and expensive rollout procedures.

SUMMARY OF THE INVENTION

The present invention therefore provides a rollout apparatus for rolling trapped air from a resin-impregnated fiber web or mat. It can, if desired, be mounted on an impregnator and lay-down device. The apparatus of the present invention is able to achieve several roller passes over the impregnated fabric as the impregnator and lay-down device makes a single pass over the mold. The apparatus comprises a frame having a longitudinal and transverse dimension and first and second carriage means mounted for reciprocating movement in a longitudinal direction on the frame. A first roller assembly having at least one roller is mounted on the first carriage means for rotation about a transversely oriented axis. A second roller assembly having at least one roller is mounted on the second carriage means for rotation about a transversely oriented axis. Means are also provided for simultaneously reciprocating the first and second carriage means toward and away from each other so that forces exerted on the frame resulting from change of direction of movement of the first and second carriage means substantially cancel each other. In this manner, reciprocating rollers are coupled to and follows the impregnated mat as it is laid down. The use of two reciprocating rollers cancels the inertial forces generated by the reciprocating mechanism and eliminates unnecessary movement or vibration in the impregnator and lay-down device as well as the overhead suspension apparatus.

BRIEF DESCRIPTION OF THE DRAWINGS

A better understanding of the present invention can be derived by reading the ensuing specification in conjunction with the accompanying drawings wherein:

FIG. 2 is an enlarged side elevation view of the rollout apparatus;

FIG. 3 is a bottom view of the rollout apparatus;

FIG. 4 is a sectional view of the rollout apparatus taken along a section line similar to line 4—4 of FIG. 3;

FIG. 5 is a side elevation view of a portion of the reciprocating mechanism shown in FIG. 2;

FIG. 8 is a side elevation view of one of the middle rollers on each of the carriage assemblies;

FIG. 9 is an end view of the mounting apparatus for the middle roller; and

DESCRIPTION OF THE PREFERRED EMBODIMENT

Figure 1:
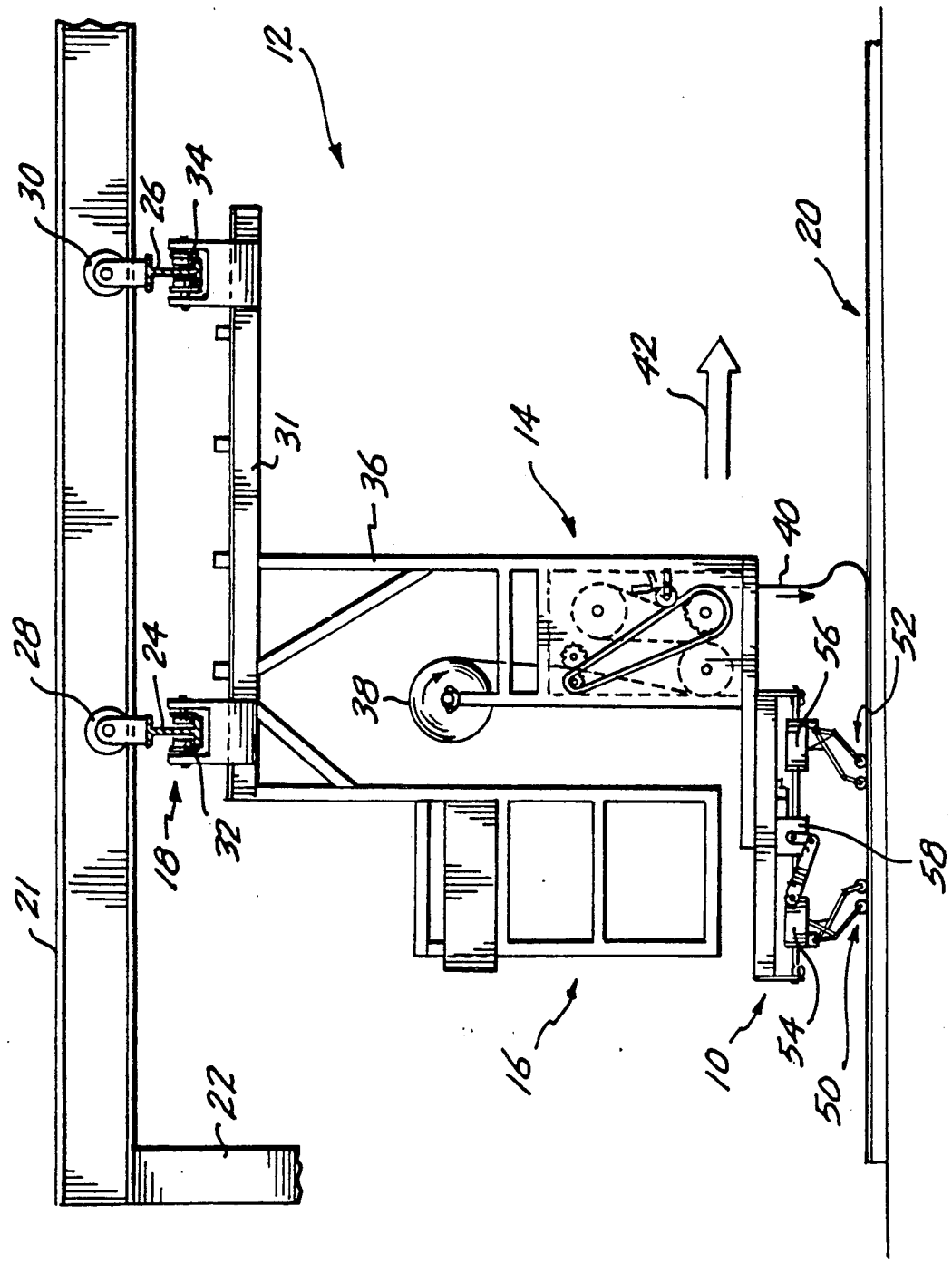
FIG. 1 is a side elevation of the rollout apparatus of the present invention connected to an impregnator and lay-down system.

Referring first to FIG. 1, the rollout apparatus constructed in accordance with the present invention, generally designated 10, is illustrated connected to a fiberglass mat impregnating and lay-down assembly generally designated 12. The assembly 12 includes the rollout apparatus, an impregnator 14, an operator's stand 16, and an overhead crane assembly, generally designated 18, for translating the impregnator and rollout device in two directions so that successive lengths of impregnated mat can be laid laterally across a mold 20. The overhead crane assembly 18 is constructed in a conventional manner and includes a pair of longitudinal rails (only one of which, 21, can be seen in FIG. 1) supported by framework 22 only partially shown. A pair of I-beams 24 and 26 depend from two sets of trucks (only one set of which, 28 and 30, can be seen in FIG. 1) riding on the longitudinal rails. The support frame 31 for the impregnator and rollout device is suspended from two sets of trucks (only one set of which, 32 and 34, can be seen in FIG. 1). These trucks ride on the upper surface of the lower cross member of the I-beams 24 and 26.

The impregnator 14 is suspended below the frame 31 by appropriate depending structure 36. The impregnator carries a roll 38 of fiberglass web, mat or roving, which is impregnated with polyester resin or other suitable resin by the impregnator 14. A sheet of resin impregnated mat 40 drops from the impregnator 14 and engages the upper surface of the mold 20 as the assembly 12 is translated in the direction of arrow 42 along the entire length of the mold 20. The rollout apparatus 10, which will be described in much more detail below, carries sets of rollers 50 and 52 that are mounted on oscillating carriages 54 and 56. A drive assembly 58 is provided to reciprocate the carriages 54 and 56 in an opposite direction to cause the rollers to traverse the impregnated mat in opposite directions as the assembly 12 traverses the length of the mold 20. In this manner, entrapped air is removed from the impregnated mat and the mat is properly seated against the mold. When the assembly 12 reaches the end of the mold, a mechanism is provided to retract the rollers 52 upwardly from the mold. The glass mat is severed and the assembly is returned to the other end of the mold, indexed transversely across the mold, and a second mat is laid down and rolled out by the rollout apparatus 10 of the present invention.

While the present invention has been described in relation to laying down successive lengths of fiberglass mat for woven rolling across a flat mold, it is to be understood that a variety of mold shapes can be employed successfully with the present invention. For example, with a modification to the mounting assembly for the rollout apparatus, the apparatus of the present invention can be utilized to lay successive lengths of impregnated fiberglass mat across a curved mold such as a boat hull.

Referring now to FIGS. 2, 3, and 4, the rollout apparatus 10 is suspended from the impregnator 14 by horizontal frame members 60. The main frame for the rollout apparatus 10 is a box-like structure including side rails 62 and 64 and end rails 66 and 68. The horizontal frame members 60 are affixed by conventional means to the end rail 68 and to a cross member 70, which is in turn affixed to the upper central portions of the longitudinal side rails 62 and 64. A pair of rods 72 and 74 are oriented longitudinally relative to the box beam and positioned under and slightly inside the side rails 62 and 64. The rods 72 and 74 are affixed to flanges 76 and 77, and 78 and 79, all of which depend from the outer surfaces of the end rails 66 and 68. A first pair of carriage blocks 80 and 82 have longitudinal bores that engage, respectively, rods 72 and 74. The carriage blocks 80 and 82 are joined by lateral member 86 to form a left-hand carriage assembly. A second pair of carriage blocks 88 and 90 are similarly mounted on rods 72 and 74, respectively. Carriage blocks 88 and 90 are joined by lateral member 92 to form a right-hand carriage assembly. Thus, each of the left and right carriage assemblies are mounted for reciprocating movement on rods 72 and 74.

The left carriage assembly carries three rollers, two outside rollers 100 and 102 and an inside roller 104. Each of these rollers is mounted for vertical swinging movement toward and away from the rollout assembly. Thus the rollers can be lowered to engage the upper surface of a mold and retracted to disengage from the mold so that the entire assembly can be moved to a new location over the mold. Similarly, the right-hand carriage assembly carries outside rollers 106 and 108 and inside roller 110. The inside rollers are offset longitudinally from the outside rollers on both carriages. Each of the rollers is of substantially equal length; however, the rollers are positioned so that the path traversed by the rollers as the apparatus is moved longitudinally across a mold overlap each other. In addition, the combined width of the path covered by the rollers is greater than the width of a fiberglass mat that is laid down so that the rollers will completely roll the entire width of the mat in a single pass.

Still referring to FIGS. 2, 3 and 4, in the preferred embodiment of the invention, the left-hand carriage is reciprocated in a longitudinal direction along the rods 72 and 74 by drive assembly 111. The drive assembly 111 includes a conventional, pneumatically powered motor 112 and a transmission 114 that are hung from the cross member 70. The transmission 114 drives a transversely oriented drive shaft 116 that extends sidewardly out of each side of the transmission 114. Crank arms 118 and 120 are mounted on opposite ends of the drive shaft 116. Connecting links 121 and 122 are coupled between the ends of the crank arms 118 and 120 and the interior surface of the carriage blocks 80 and 88, respectively.

As the drive shaft 116 is rotated, the crank mechanism causes the carriage blocks 80 and 82, and thus the entire left carriage assembly, to reciprocate in a longitudinal direction. Thus, as the rollout apparatus traverses the length of the mold, the rollers are reciprocated back and forth across the fiberglass mat to smooth the mat and drive out entrapped air.

The right-hand carriage assembly could be driven by a similar crank mechanism if desired. However, in the preferred embodiment, the left-hand carriage assembly is coupled to the right-hand carriage assembly by an endless cable better illustrated in FIGS. 3 and 5. In FIG. 5, it should be noted that only the carriage blocks 80 and 88 have been illustrated. The rollers as well as the drive assembly 111 have been eliminated for purposes of simplicity. A pair of sheaves 123 are mounted outboard from and at opposite ends of the rod 72. The sheaves 123 are carried by brackets 124 depending respectively from opposite ends of side rail 62. An upper run of cable 126 is coupled by a tensioner 128 to the upper end of carriage block 80. The upper run of cable 126 extends through and around the left sheave 123, back toward and beyond the carriage block 80, and is coupled to carriage block 88. Similarly, a lower run of cable 130 is coupled by a tensioner 132 to the lower portion of carriage block 88, extends through and around the right sheave 123 back toward the carriage block 88, and is affixed to the upper portion of carriage block 80 near the affixation point of the upper run of cable 26. A similar cable coupling assembly 134 couples carriage blocks 82 and 90 on the opposite side of the rollout assembly. This cable coupling mechanism causes the right-hand carriage assembly to simultaneously oscillate with the left-hand carriage assembly but in an opposite direction. In this manner, the forces created by reversal of direction of the two carriage assemblies cancel each other so that a very smooth and vibration-free operation of the rollout apparatus results. This design allows the unit to be suspended and manipulated into vertical and odd positions with a lightweight frame, expanding the capability and increasing the utility of the apparatus.

Figure 7:
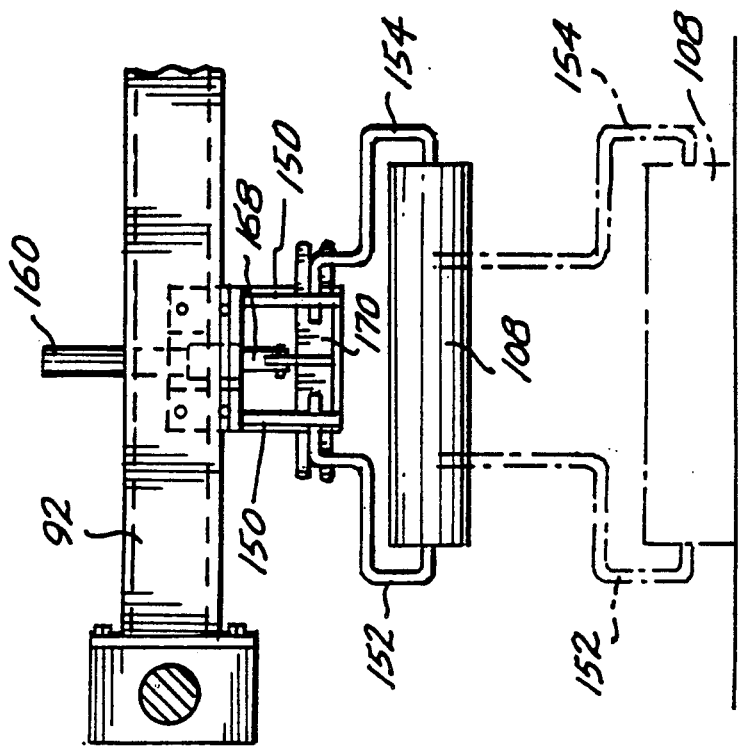
FIG. 7 is an end elevation view of the mounting mechanism for the roller of FIG. 6.
Figure 6:
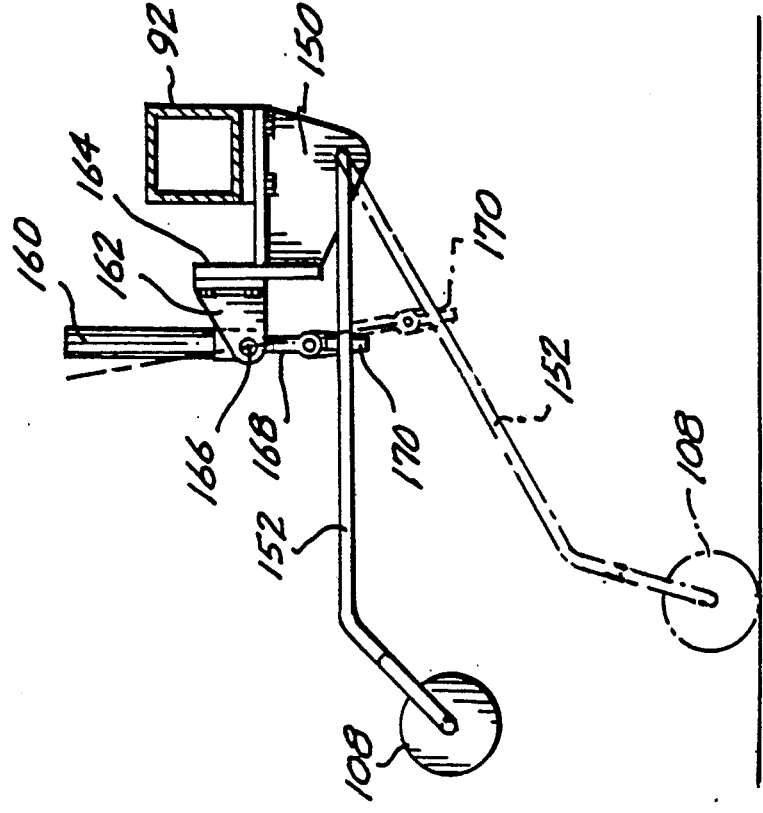
FIG. 6 is an enlarged side elevation view of one of the side rollers on each of the carriage assemblies.

Referring now to FIG. 6 and FIG. 7, the mounting assembly for outside roller 108 on the right-hand carriage assembly is illustrated. Similar mounting assemblies are used for the other outside rollers 100, 102 and 106. A pair of mounting brackets 150 depend from lateral member 92. The brackets 150 are closely spaced. A pair of mounting arms 152 and 154 are mounted in transverse bores in the brackets 150 for up and down swinging movement. When the arms 152 and 154 are in a retracted position they extend horizontally in a longitudinally inward direction from the brackets 150 then separate and extend laterally from each other and then form a J-shaped loop. The ends of the J terminate inside the roller 108 to mount the roller on the arms 152 and 154 for rotational movement about a transverse, horizontal axis. At a location about two-thirds of the distance between the brackets 150 and the roller 108, the arms 152 and 154 bend downwardly at an approximate 45° angle. As will be understood after the central roller mounting assembly is described, this geometric arrangement positions the outside rollers below the drive assembly 111 toward the longitudinal center of the rollout apparatus. The inside rollers are then positioned longitudinally outside the outside rollers to provide a compact roller arrangement and to allow the rollers not to interfere when they are in their retracted and extended positions. If desired, the mounting brackets 150 can be modified so that they are mounted on lateral member 92 for pivotal movement about a longitudinal and horizontal axis. In this manner the roller 108 can swing sidewardly so as to conform to an irregular surface.

A retraction cylinder 160 is mounted in a yoke 162, in turn extending longitudinally inward from a support bracket 164 mounted on the inner portions of the brackets 150. The cylinder 160 is mounted for pivotal movement about a horizontal axis by a suitable pivot pin 166. The piston arm 168 extends downwardly from the cylinder 160 and couples to a cross member 170 interconnecting the roller mounting arms 152 and 154 adjacent the brackets 150. As the piston arm 168 is extended and retracted, the mounting arms 152 and 154 are swung upwardly and downwardly. The plumbing for the pneumatic cylinder (and for the pneumatic motor) are conventional and therefore not illustrated.

Referring now to FIG. 8 and FIG. 9, the mounting assembly for the inside (in the transverse direction) roller 110 is illustrated. The mounting assembly is very similar to that used for the outer rollers and includes depending mounting brackets 180 extending downwardly from and affixed to the lateral member 92. Mounting arms 182 and 184, when in the retracted position, extended at a 45° angle downwardly and inwardly from the brackets 180. Both arms about one-third of the distance between the roller 110 and the brackets bend and extend in a horizontal direction longitudinally inward relative to the carriage assembly. The arms then extend laterally outward, loop in a J shape, and terminate in the roller 110 to mount the roller for rotation about a lateral horizontal axis. If desired, the mounting brackets 180 can similarly be monitored for pivotal movement about a horizontal and longitudinal axis so that the rollers can pivot from side to side to conform to an irregular mold surface.

A pneumatic cylinder 186 is mounted in a yoke 188 extending forward from the brackets 180. Piston arm 190 is coupled to a cross member 192 interconnecting the arms 182 and 184 to power the arms for upward and downward swinging movement. As can be seen in FIG. 8, the arms 182 and 184 are of sufficient length to mount the roller 110 longitudinally outwardly from the outside rollers 106 and 108 as shown in dotted outline in FIG. 8.

The rollers 100-108 used on both carriages are of conventional construction. They can be finned with a plurality of circumferential ridges spaced across the axial dimension of the roller. If desired, the fins can be notched to improve their performance.

Figure 10:
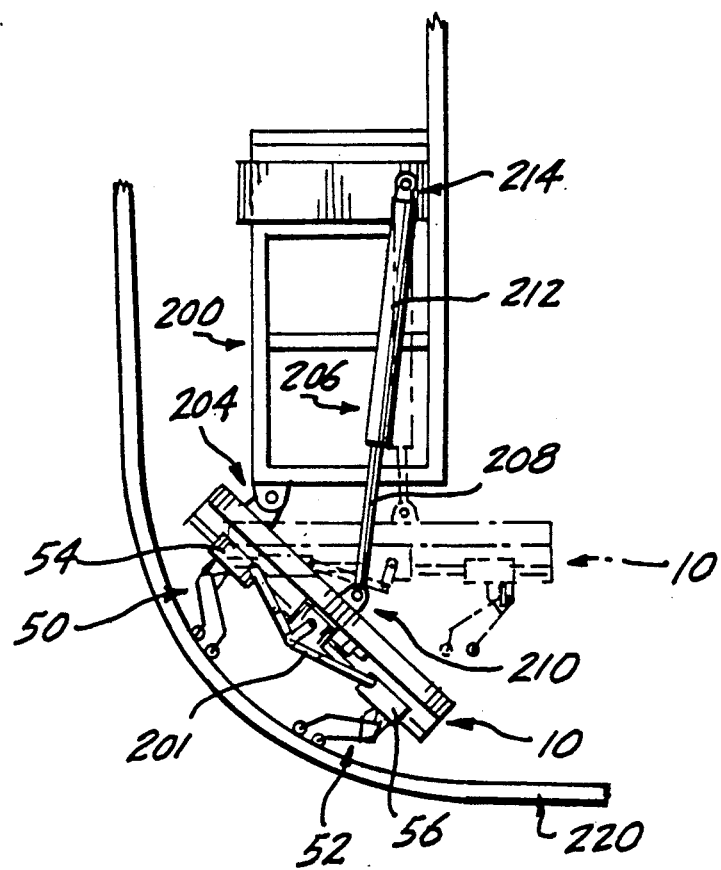
FIG. 10 is a side elevation view of an alternative embodiment of the invention.

Referring now to FIG. 10, an alternate assembly for mounting the rollout apparatus 10 is illustrated. In this embodiment, the apparatus is coupled to an overhead frame 200, which in turn can be attached (by means not shown) to an overhead crane for movement in longitudinal and transverse directions as well as in a vertical direction. In this embodiment, a dual crank mechanism serves to reciprocate the carriages as a substitute for the crank and cable assembly of the previous embodiment. In this embodiment a second crank arm 201 couples the crank arm to the right hand carriage assembly 56.

The left side of the rollout apparatus 10 is pivotally connected by suitable flanges and pivot pins 204 to the bottom of the frame 200 for swinging movement about a transverse axis. A conventional hydraulic or pneumatic piston and cylinder assembly couples the right center portion of the apparatus to the frame. The piston arm 208 is pivotally attached to the apparatus by flange and pin 210, while the cylinder 212 is attached to the frame via flange and pin 214. The cylinder 212 is oriented vertically so that extension of the piston arm will cause the right hand side of the rollout apparatus 10 to swing downwardly. In this manner, the rollout apparatus can be manipulated, in conjunction with the mounting assembly for the frame 200, so that the rollers 50 and 52 can be made to conform to molds in a variety of shapes, e.g., a portion of about hull 220 shown in FIG. 10.

The present invention has been described in relation to a preferred embodiment. One of ordinary skill after reading the specification will be able to effect various changes, substitution of equivalents and other alterations to the preferred embodiment without departing from the broad concepts disclosed herein. It is accordingly intended that the Letters Patent granted hereon be limited only by the definition contained in the appended claims and equivalents.

The embodiments of the invention in which an exclusive property or privilege is claimed are defined as follows:

1. A rollout apparatus for rolling trapped air from a resin impregnated fiber mat placed on a mold, said apparatus comprising:
   a frame having a longitudinal and a transverse dimension;
   a means for moving said frame relative to the mold;
   a first carriage means mounted for reciprocating movement in a longitudinal direction on said frame;
   a first roller assembly having at least one roller mounted on said first carriage means for rotation about a transversely oriented axis;
   a second carriage means mounted for reciprocating movement in a longitudinal direction on said frame;
   a second roller assembly having at least one roller mounted on said second carriage means for rotation about a transversely oriented axis; and
   means for simultaneously reciprocating said first and second carriage means toward and away from each other so that forces exerted on said frame resulting from change of direction of movement of said first and second carriage means substantially cancel each other.

2. The apparatus of claim 1 wherein said frame moving means comprises:
   an overhead track assembly and means for mounting said frame on said overhead track assembly for selected movement in a longitudinal direction and in a transverse direction.

3. The apparatus of claim 1 further comprising:
   means for independently mounting said at least one roller of said first roller assembly for vertical swinging movement relative to said first carriage means; and
   means for independently mounting said at least one roller of said second roller assembly for vertical swinging movement relative to said second carriage means.

4. The apparatus of claim 1 wherein said means for reciprocating comprises:
   a crank assembly mounted on said frame;
   said crank assembly including a crank arm having an inner end mounted for rotation about a transverse axis and an outer end, said crank assembly further including a connecting rod having one end connected with the outer end of said crank arm and the other end coupled to said first carriage assembly.

5. The apparatus of claim 4 wherein said means for reciprocating further comprises:

means coupling said first carriage means to said second carriage means to simultaneously cause said second carriage means to move in a direction opposite from said first carriage means and to simultaneously reverse directions at said first and second carriage means.

6. The apparatus of claim 5 wherein said means for reciprocating comprises first and second pulleys mounted adjacent but longitudinally beyond said first and second carriage assemblies for rotation about transverse axes, an endless cable draped about said pulleys, said endless cable having an upper run and lower run, said upper run being connected to one of said first and second carriage assemblies, and said lower run being coupled to the other of said first and second carriage assemblies.

7. The apparatus of claim 4, wherein said crank assembly further comprises a second connecting rod having one end connected with the outer end of the crank arm and the other end coupled to the second carriage assembly.

8. The apparatus of claim 1, further comprising an overhead track assembly and means for mounting said frame to said overhead track assembly for swinging movement about a generally horizontal axis.

* * * * *